(12) United States Patent
Shibata et al.

(10) Patent No.: US 7,298,524 B2
(45) Date of Patent: Nov. 20, 2007

(54) IMAGE PROCESSING METHOD, PRINTER AND STORAGE MEDIUM

(75) Inventors: Tsuyoshi Shibata, Kanagawa (JP); Noribumi Koitabashi, Kanagawa (JP); Masataka Yashima, Tokyo (JP); Hitoshi Tsuboi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 09/987,530

(22) Filed: Nov. 15, 2001

(65) Prior Publication Data

US 2002/0097412 A1 Jul. 25, 2002

(30) Foreign Application Priority Data

Nov. 17, 2000 (JP) ............... 2000-352001

(51) Int. Cl.
*G06F 15/00* (2006.01)
*G06K 15/00* (2006.01)

(52) U.S. Cl. ......................... 358/1.9; 358/2.1
(58) Field of Classification Search ........... 358/1.8, 358/2.99, 3.01, 3.06, 3.07, 3.08, 3.13, 3.27, 358/1.9, 2.1, 500, 515, 512, 517, 518, 519, 358/520, 534, 535, 536, 3.1, 501, 502; 382/162, 382/163, 164, 165, 166, 167; 347/15, 43, 347/100

See application file for complete search history.

(56) References Cited

U.S. PATENT DOCUMENTS

| 4,313,124 | A | | 1/1982 | Hara | ............... 346/140 |
|---|---|---|---|---|---|
| 4,345,262 | A | | 8/1982 | Shirato et al. | ............... 346/140 |
| 4,459,600 | A | | 7/1984 | Sato et al. | ............... 346/140 |
| 4,463,359 | A | | 7/1984 | Ayata et al. | ............... 346/1.1 |
| 4,558,333 | A | | 12/1985 | Sugitani et al. | ............... 346/140 |
| 4,723,129 | A | | 2/1988 | Endo et al. | ............... 346/140 |
| 4,740,796 | A | | 4/1988 | Endo et al. | ............... 346/1.1 |
| 5,882,390 | A | * | 3/1999 | Nagai et al. | ............... 106/31.49 |
| 5,917,994 | A | * | 6/1999 | Perumal et al. | ............... 358/1.9 |
| 5,982,993 | A | * | 11/1999 | Slade | ............... 358/1.9 |
| 6,268,939 | B1 | * | 7/2001 | Klassen et al. | ............... 358/518 |
| 6,406,528 | B1 | * | 6/2002 | Macholdt et al. | ............... 106/31.49 |
| 6,530,638 | B2 | * | 3/2003 | Shibata et al. | ............... 347/15 |
| 6,616,257 | B2 | * | 9/2003 | Imanaka et al. | ............... 347/10 |
| 6,803,932 | B2 | * | 10/2004 | Itoh et al. | ............... 347/112 |

FOREIGN PATENT DOCUMENTS

| JP | 59-123670 | 7/1984 |
|---|---|---|
| JP | 59-138461 | 8/1984 |

* cited by examiner

*Primary Examiner*—Dov Popovici
(74) *Attorney, Agent, or Firm*—Fitzpatrick, Cella, Harper & Scinto

(57) ABSTRACT

A secondary color is used for printing an image with a printer so as to reduce the granularity of the printed image, particularly the light image area. Data of magenta and cyan color components of image data is subjected to under-removal processing to generate blue ink image data as the mentioned secondary color. A blue ink dot is printed in accordance with the blue ink data obtained by the under removal processing to replace the magenta and cyan data. As a result, it is possible to reduce the granularity that would otherwise be caused by localized distributions of magenta and cyan dots.

11 Claims, 8 Drawing Sheets

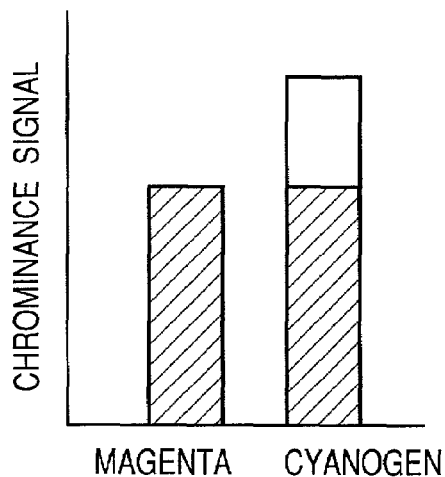
FIG. 4A
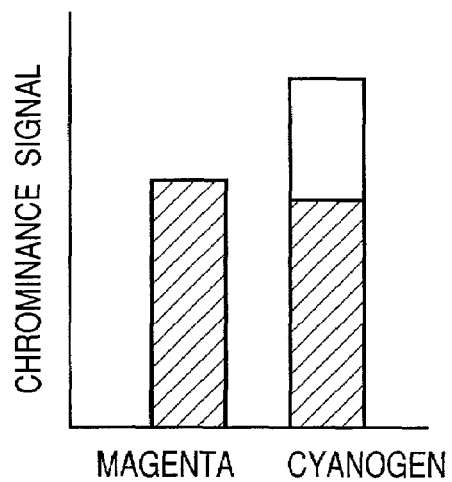
FIG. 4B
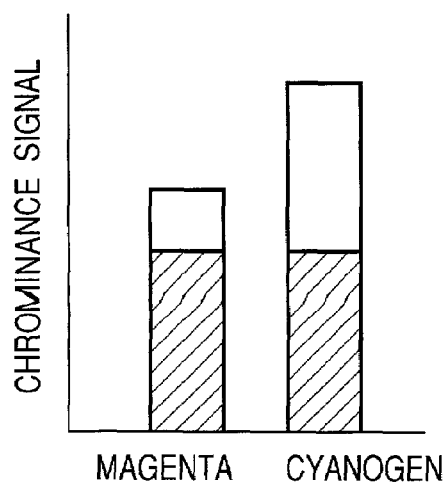
FIG. 4C
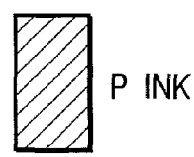
P INK
L (M INK) < L (P INK)
L (C INK) < L (P INK)
RELATIONSHIP OF LIGHTNESS OF INK DOT

FIG. 6A

| C(i, j)=56<br>M(i, j)=94 | C(i+1, j)=60<br>M(i+1, j)=100 |
|---|---|
| C(i, j+1)=50<br>M(i, j+1)=50 | C(i+1, j+1)=48<br>M(i+1, j+1)=20 |

FIG. 6B

| C'(i, j)=0<br>M'(i, j)=38<br>P(i, j)=56 | C'(i+1, j)=0<br>M'(i+1, j)=40<br>P(i+1, j)=60 |
|---|---|
| C'(i, j+1)=0<br>M'(i, j+1)=0<br>P(i, j+1)=50 | C'(i+1, j+1)=28<br>M'(i+1, j+1)=0<br>P(i+1, j+1)=20 |

FIG. 8A

| C(i, j)=56<br>M(i, j)=94 | C(i+1, j)=60<br>M(i+1, j)=100 |
|---|---|
| C(i, j+1)=50<br>M(i, j+1)=50 | C(i+1, j+1)=48<br>M(i+1, j+1)=20 |

FIG. 8B

| P(i, j)=56 | P(i+1, j)=60 |
|---|---|
| P(i, j+1)=50 | P(i+1, j+1)=20 |

FIG. 8C

| P(i, j)=255 | P(i+1, j)=0 |
|---|---|
| P(i, j+1)=0 | P(i+1, j+1)=0 |

FIG. 8D

| C'(i, j)=−199<br>M'(i, j)=−161<br>P(i, j)=255 | C'(i+1, j)=60<br>M'(i+1, j)=100<br>P(i+1, j)=0 |
|---|---|
| C'(i, j+1)=50<br>M'(i, j+1)=50<br>P(i, j+1)=0 | C'(i+1, j+1)=48<br>M'(i+1, j+1)=20<br>P(i+1, j+1)=0 |

FIG. 8E

| C'(i, j)=0<br>M'(i, j)=0<br>P(i, j)=1 | C'(i+1, j)=0<br>M'(i+1, j)=0<br>P(i+1, j)=0 |
|---|---|
| C'(i, j+1)=0<br>M'(i, j+1)=0<br>P(i, j+1)=0 | C'(i+1, j+1)=0<br>M'(i+1, j+1)=0<br>P(i+1, j+1)=0 |

IMAGE PROCESSING METHOD, PRINTER AND STORAGE MEDIUM

BACKGROUND OF THE INVENTION

1. Field of the Invention

The present invention relates to an image processing method, a printer (printing apparatus) and a storage medium, and more particularly to techniques of reducing the so-called granularity of a color image printed by using a plurality of different color materials.

The invention is applicable to all apparatuses using printing media such as paper, leather, unwoven cloth, OHP sheets, and metal. Specific examples of such apparatuses include business machines such as printers, copy machines and facsimiles, industrial machines such as printing machines and textile printing machines, and the like.

2. Related Background Art

Information processing apparatuses such as copy machines, word processors and computers, and communication apparatuses are widely used, and apparatuses for printing data from such information processing apparatuses, for example, ink jet type printers are prevalent. In order to improve the print speed of such an ink jet type printer, a print head having a plurality of ink jet nozzles integrally disposed is generally used. Such a print head capable of printing different colors has recently come to be widely used.

In ink jet printing, ink is used as the recording liquid and is jetted out from an ink discharge opening of a print head to be deposited on a printing medium such as a paper sheet to form a print dot. Since this is a non-contact printing method, this method has the advantage that noise is low. It is also easy to dispose nozzles of a print head at a high density so that a printed image can have a high resolution and the print speed can be made high. A color image can be printed with a relatively simple head structure, and the apparatus itself can be made compact and simple. In addition, a high-quality and inexpensive image printed on a printing medium such as a plain paper sheet can be obtained without any particular additional processes such as development and fixing. Since this method has many advantages, as described above, it is predominant nowadays. High image quality and high print speed are desired more and more with the advent of color printing.

As the ink jet printing method of printing a color image with three colors of inks, cyan (C), magenta (M) and yellow (Y), or with black (K) ink as well (three- or and four-color printing, respectively), many methods have been proposed to form a multi-tonal image.

With one method which has been adopted by many printers, the size of the dots formed on a printing sheet with discharged ink is maintained constant, and the tonal level of an image to be printed is changed by changing the dot density (dot discharge frequency per unit area). With another method, the diameter of a dot to be formed on a printing sheet is adjusted from dot to dot, so that the density per unit area varies within the image.

With recent developments of fine working of a head for generating an ink droplet, the number of dots (dot density: dpi) per unit length and the variable range of a dot diameter are being improved year after year. In the case of an ink jet printer, the print density (resolution) is about 300 dpi to 1200 dpi, and the ink droplet diameter is several tens of microns. This printing performance is far inferior to a silver-salt photograph (it is said that the resolution of an image on film is several thousand dpi).

In a low density area of a print image formed by an ink jet printer, i.e., in an area having a low dot density, the ink dots are relatively widely dispersed, and the print image may show conspicuous granularity (a grainy appearance). The positions and distribution of dots are changed as a result of binarization with certain binarizing methods, such as the dither method, even within an area where the print density is uniform. Therefore, even in a low dot density area where dots are dispersed, dots may be formed relatively tightly clustered in a small area and not distributed uniformly. In such a case, granularity becomes conspicuous.

With a conventional binarizing method, a printer halftone process has been devised in such a manner that the distribution of dots of each color in a low print density area is controlled to prevent clustering of dots of that color, as much as possible, to reduce the granularity.

However, granularity may become conspicuous even if such conventional method is used. This is because, even if the distribution of color dots is controlled to prevent clustering, this method is performed separately for each color, and it happens that the distributions of cyan and magenta are localized in some cases so that a viewer sees granularity. Although there is an approach that involves preventing clustering of the dots of cyan and magenta taken together, the resulting reduction of granularity is not sufficient if the dot diameter is relatively large.

With another known method, the granularity is reduced by using ink whose color material has a low density, such as a dye. Using ink having a low density in addition to ink of respective colors, however, may result in an increased cost of the printing apparatus.

SUMMARY OF THE INVENTION

The invention has been made in order to solve the above-described conventional problems. An object of the invention is to reduce the granularity of a print image by using secondary colors, with relatively simple signal processing.

According to one aspect of the present invention, there is provided an image processing method of generating print data for a plurality of different color materials to be used by a printer, based on data to be printed, the method comprising: a step of generating the print data of a secondary or higher mixture color for predetermined two or more color hues among the plurality of print data, based on the data to be printed; and a step of generating print data replaced at least partially with the print data of the secondary or higher mixture color for the predetermined two or more hues.

According to another aspect of the present invention, there is provided an image processing method of generating print data for a plurality of different color materials to be used by a printer, based on data to be printed, the method comprising: a step of generating n-value print data of a secondary or higher mixture color for predetermined two or more color hues among the plurality of print data, based on m-value data to be printed (m>n: m and n being an integer); a step of causing the generated n-value print data of the secondary or higher mixture color to correspond to the m-value data; and a step of generating n-value print data for the predetermined two or more color hues based on data obtained by subtracting the corresponded m-value data of the secondary or higher mixture color from the m-value data for the predetermined two or more color hues.

According to another aspect of the present invention, there is provided a printer for printing data by using print data for a plurality of different color materials to be used by a printer, based on data to be printed, the printer comprising: printing means for printing each color by using a plurality of different color materials based on the print data; and data supplying means for supplying the printing means with print data generated by a secondary mixture color data generating process of generating the print data of a secondary or higher mixture color for predetermined two or more color hues among the plurality of print data, based on the data to be printed and by a data generating process of generating print data replaced at least partially with the print data of the secondary or higher mixture color for the predetermined two or more hues.

According to another aspect of the present invention, there is provided a printer for printing data by using print data for a plurality of different color materials to be used by a printer, based on data to be printed, the printer comprising: printing means for printing each of colors by using a plurality of different color materials based on the print data; and data supplying means for supplying the printing means with print data generated by a process of generating n-value print data of a secondary or higher mixture color for predetermined two or more color hues among the plurality of print data, in accordance with m-value data to be printed (m>n and m and n being integers), by a process of causing the generated m-value print data of the secondary or higher mixture color to correspond to the m-value data, and by a process of generating n-value print data for the predetermined two or more color hues based on data obtained by subtracting the corresponded m-value data of the secondary or higher mixture color from the m-value data for the predetermined two or more color hues.

According to the invention, among a plurality of different color materials to be used by a printer, print data of the secondary color is generated for predetermined two color materials, and print data replaced at least partially with the generated secondary color print data is generated. By using these print data, printing is performed. Therefore, even if dots are printed by using the predetermined two color materials, the print image can be formed by using at least partially the secondary color. Therefore, a low density image area or a high lightness image area where dots of the predetermined colors are locally distributed can be made small.

Furthermore, when generating the print data of the predetermined color materials, n-value print data for the two color materials is generated in accordance with m-value data of the two color materials subtracted by the secondary color m-value data. Therefore, for example, in generating the print data of the two color materials by binarizing the (m=256) value data, the secondary color data is once binarized to "1" or "0" data, the "1" and "0" data being made in one-to-one correspondence with "255" and "0", respectively. In accordance with the 256 value data subtracted by the corresponding value of the binary data, the print data of the two color materials is generated. There is a high possibility that this print data is "0". Namely, there is a high possibility that the image is printed by the predetermined two color materials.

Other features and advantages of the present invention will become apparent from the following description taken in conjunction with the accompanying drawings.

BRIEF DESCRIPTION OF THE DRAWINGS

FIGS. 4A, 4B and 4C are diagrams illustrating a process of generating blue ink data according to an embodiment arrangement of the invention.

FIGS. 6A and 6B are schematic diagrams illustrating the process of generating blue ink data for respective pixels.

FIGS. 8A, 8B, 8C, 8D and 8E are schematic diagrams illustrating the process of generating blue ink data for respective pixels shown in FIG. 7 and the process of generating cyan and magenta ink data.

DETAILED DESCRIPTION OF THE PREFERRED EMBODIMENTS

The embodiment arrangements of the invention will be described with reference to the accompanying drawings.

Figure 1:
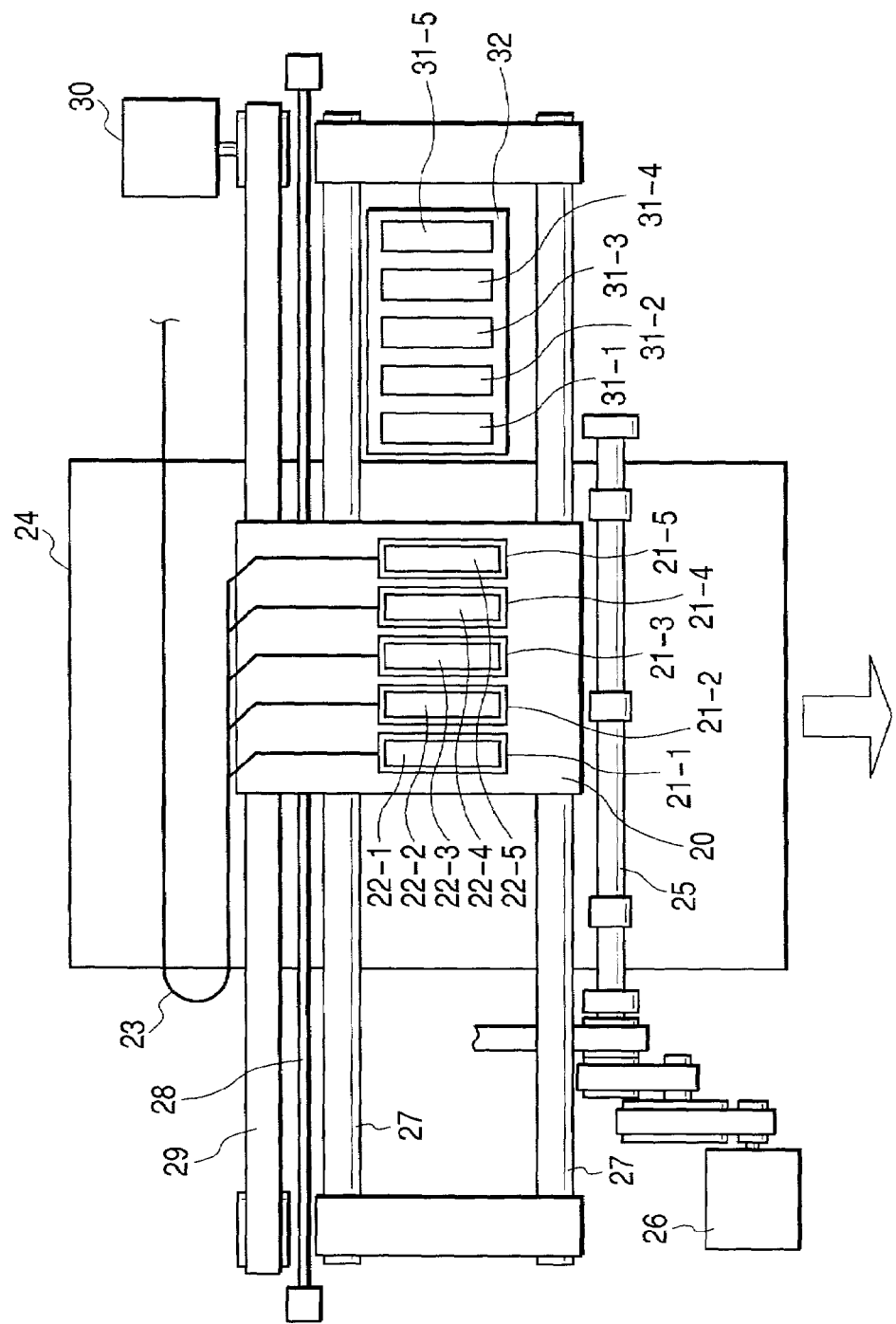
FIG. 1 is a top view showing the outline structure of an ink jet printer according to an embodiment arrangement of the invention.

FIG. 1 is a top view schematically showing the outline structure of an ink jet printer according to an embodiment arrangement of the invention.

A plurality of ink jet heads 21-1 to 21-5 (hereinafter simply called "head" where appropriate) are mounted on a carriage 20. Each ink jet head has a plurality of ink discharge openings disposed at a predetermined pitch for discharging ink. Each of the heads 21-1, 21-2, 21-3, 21-4, and 21-5 discharges printability-improved ink (P), black (K) ink, cyan (C) ink, magenta (M) ink and yellow (Y) ink. In this embodiment, the "printability-improved ink" is ink having a blue hue, chosen because blue is the secondary color of cyan and magenta, and as will be described below is discharged in accordance with the data obtained by subjecting the cyan and magenta print data to predetermined processes. Because the use of this ink makes it possible as described below to reduce granularity in the low density area of a print image, this ink is called printability-improved ink.

Each head is structured integrally with an ink tank for reserving ink to be supplied to the head. Each of the integrally structured ink cartridges 22-1 to 22-5 is removably mounted on the carriage 20. The structure of the head and ink tank is not limited only to this arrangement, but the heads and ink tanks may be discrete and can be removably mounted on the carriage.

The carriage 20 mounting the ink cartridges can be moved on two guide shafts 27 by a drive force of a carriage motor 30 transmitted via a belt 29. Control signals such as a print image signal are supplied from a printer control unit to be described later via a flexible cable 23 to each head. While the carriage 20 moves, each color head scans a printing medium 24, and during this scanning, ink is discharged in accordance with the print image signals to print an image. The printing medium may be a plain paper sheet, a high quality printing sheet, an OHP sheet, a glossy sheet, a glossy film, a mail sheet or the like. Such a printing medium 24 is transported intermittently by a predetermined amount along the direction indicated by the arrow during the head scanning, by an unrepresented transport roller and a sheet discharge roller 25. The unrepresented transport roller and the sheet discharge roller 25 are rotated by a drive force of a transport motor 26 transmitted via a predetermined transport mechanism to transport the printing medium in the manner described above. The scanning position of each head is detected with a linear encoder 28, and in accordance with this detection signal, for example, the discharge timing of each head is controlled.

Each of the ink jet heads 21-1 to 21-5 has a heat generating element (electrothermal conversion element) for generating heat energy. By utilizing the generated heat energy, bubbles are formed in ink to discharge the ink by the pressure of the bubbles.

At the home position of the carriage 20 outside the scanning area of each head, recovery units 32 each having a cap 31 are provided. When a print operation is not being performed, the carriage 20 is moved to this home position to cover the ink discharge opening of each of the heads 21-1 to 21-5 with a corresponding one of caps 31-1 to 31-5. It is therefore possible to prevent evaporation of ink solvent and to prevent fixation or thickening of the ink that would otherwise be caused by the evaporation of the ink solvent. This capping can also prevent foreign matter such as dusts from adhering to the ink discharge opening and thus prevents blockage by such foreign matter. It is also possible to perform suction recovery by driving an unrepresented pump in the capping state to suck ink from the head via the discharge opening and maintain a good discharge state of the discharge opening which may otherwise be in a discharge defective state. Each head can perform a so-called preliminary discharge relative to the cap, which discharge is not associated with actual printing. In this manner, for example, discharge-defective states and blockage or the like of a discharge opening that is used only relatively infrequently (having a low discharge frequency) can be avoided. An unrepresented blade is provided near the recovery unit 32 so that the ink discharge opening can be cleaned while each head moves.

Figure 2:
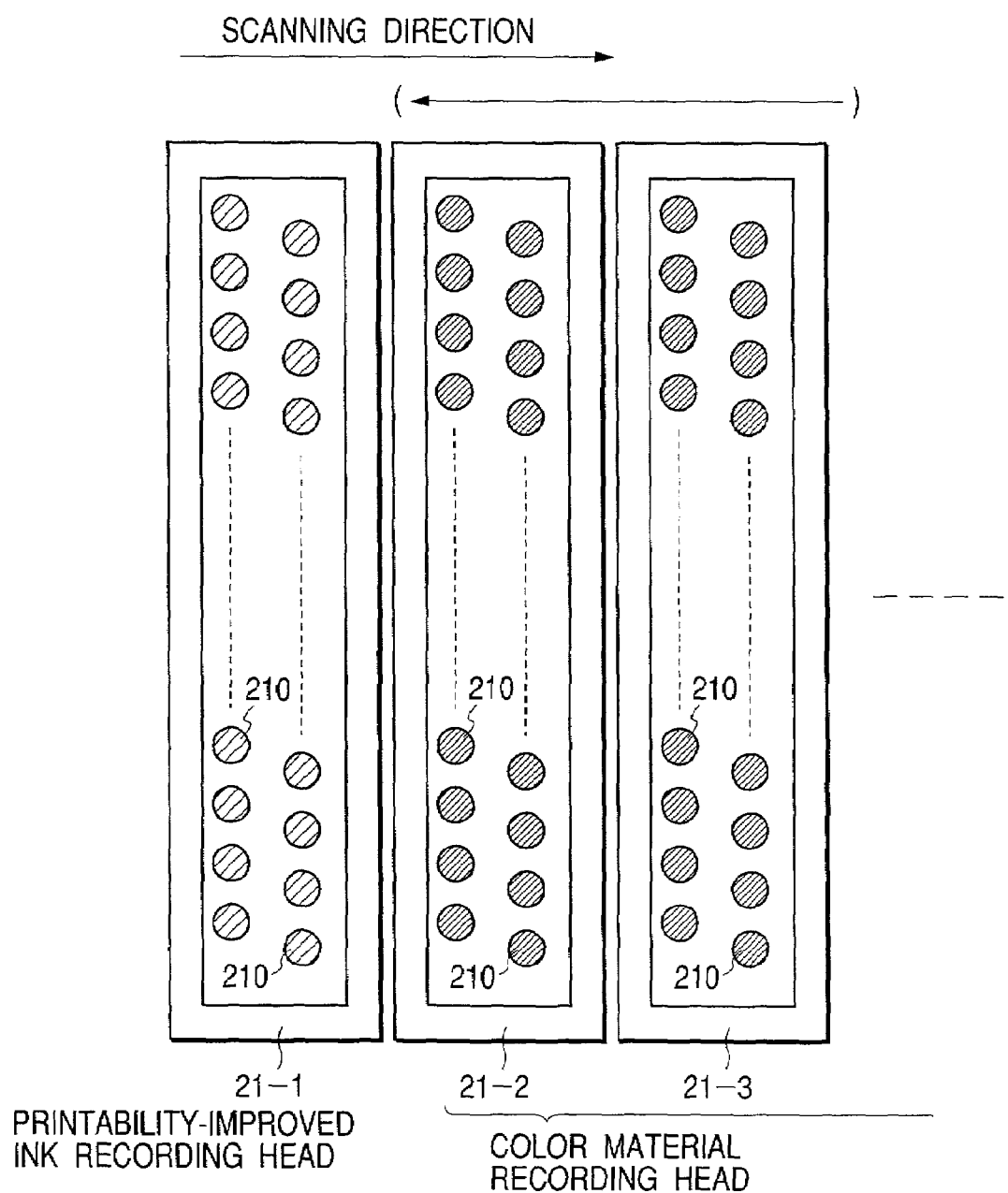
FIG. 2 is a front view showing an ink discharge opening of a ink jet head used by the printer shown in FIG. 1.

FIG. 2 is a schematic diagram showing ink discharge openings of the ink jet heads 21-1 to 21-5.

As shown in FIG. 2, each of the ink jet heads 21-1 to 21-5 has two columns of ink discharge openings 210. For example, each column has ink discharge openings in a layout at a density of 300 dpi, and two rows are shifted or staggered relative to each other by a half pitch of the layout, so that the discharge opening layout as a whole has a density of 600 dpi.

Each head is structured roughly by a substrate and a ceiling plate. More specifically, the substrate is formed with electrothermal conversion elements (heaters) for respective discharge openings, electrode wiring patterns for applying an electric pulse signal to each heater, a driver element for switching the pulse signal and the like. The ceiling plate is formed with ink discharge openings 210 shown in FIG. 2, partitions for forming flow paths to the openings, and partitions for forming a common liquid chamber communicating in common to the flow paths. The substrate and ceiling plate structured as described above are joined together to form the main structure of the head. A heater is mounted on the flow path communicating with each ink discharge opening, and ink is supplied from the common liquid chamber to the flow path. Ink can be discharged by forming a bubble or bubbles in the ink. Morever, the electric pulse to be applied to the heater may be changed to adjust generation of the bubble by controlling its voltage. Then, it is possible to control the volume of ink droplet to be discharged from the discharge opening by this adjustment. A more effective structure is to drive the heater with a plurality of pulses including pre-pulses for heating the heater to the degree not forming bubbles and main pulses for forming bubbles to thereby change the discharge ink amount in a relative broad range.

The ink jet printing method applicable to this invention is not limited to the bubble jetting (BJ) method using electrothermal conversion elements (heaters).

For example, in the continuous method by which ink droplets are continuously discharged to change the ink droplets to fine particles, a charge control type, a dispersion control type or the like may be used. In the on-demand method similar to the BJ method by which ink droplets are discharged when necessary, an electrothermal conversion element such as a piezo-element may be used. The invention is not limited to be applied only to the ink jetting method. For example, the invention is applicable to the electrophotography method if a print image suffers from granularity.

Figure 3:
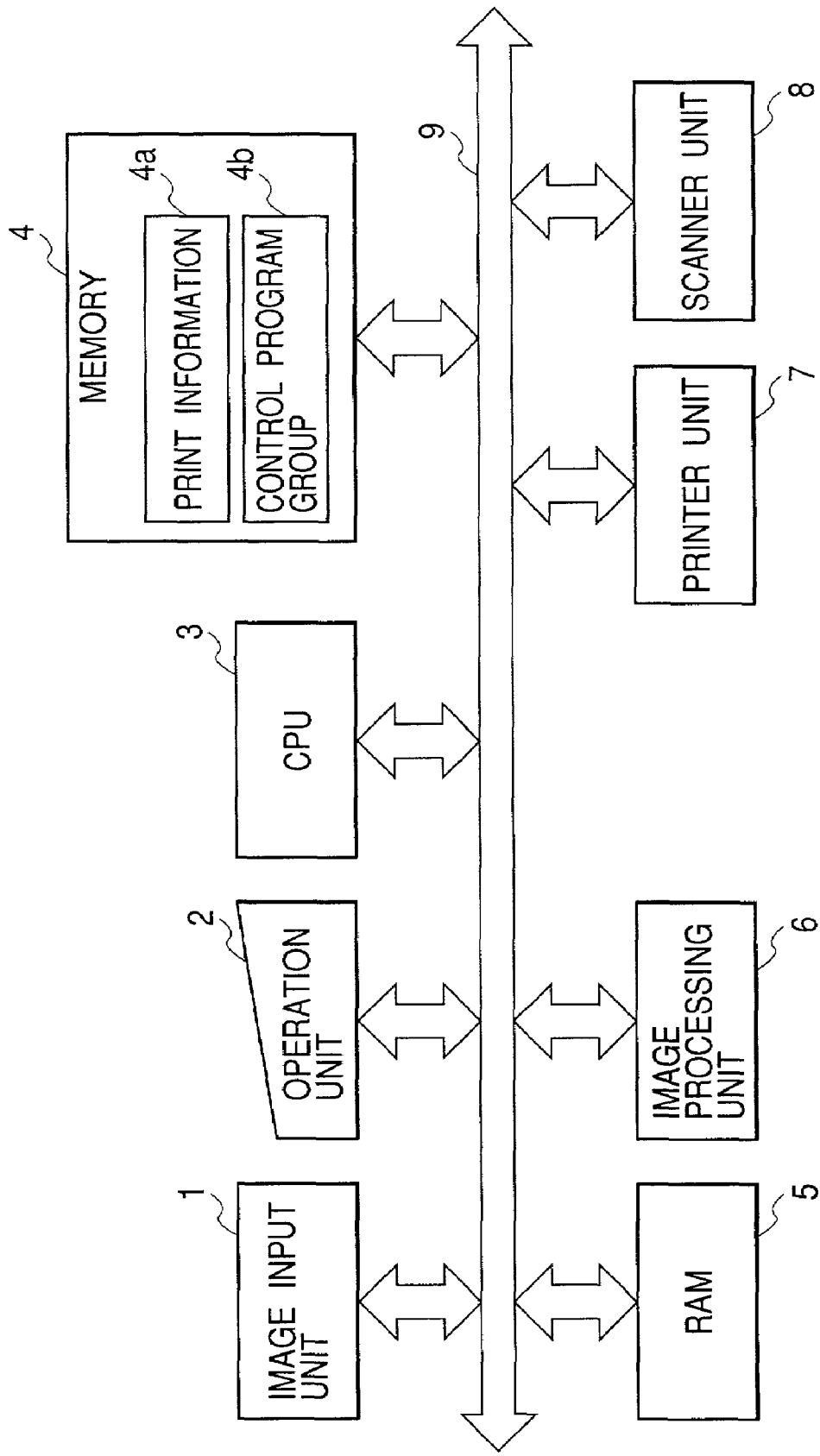
FIG. 3 is a block diagram showing the structure of a control system of the ink jet printer shown in FIG. 1.

FIG. 3 is a block diagram showing the structure of a control system of the above-described ink jet printer.

Referring to FIG. 3, an image data input unit 1 is supplied with image data from a host apparatus such as a personal computer. A user operates an operation unit 2 to enter various commands to the printer. A CPU 3 controls the overall operation of the printer. A memory 4 stores various data. This memory 4 has a print information storage memory 4a for storing print information of the printability-improved ink, and a control program group memory 4b. A RAM 5 is used as a working area or the like for CPU 3. An image processing unit 6 performs image processing and the like for the printability-improved ink, to be described with reference to FIGS. 4A to 4C and following drawings. A printer unit 7 prints an image. A scanner unit 8 reads a print original, a predetermined patch printed with the printer of this embodiment arrangement for the head calibration, and the like. A bus 9 is used for transferring various data among the above-described elements.

More specifically, the image input unit 1 is supplied with tonal image data from an image input apparatus such as a digital camera or a scanner, and tonal image data from a personal computer. The operation unit 2 has various keys for a user to employ in setting various parameters and instructing a print start. CPU 3 controls the whole of the apparatus in accordance with various programs stored in the control program group memory 4b of the memory 4, and also controls the image processing unit 6 for performing a process regarding the printability-improved ink to be described later. The memory 4 stores programs for the operation of the printer, such as the control programs and error processing programs. The memory 4 may be a ROM, a FD, a CD-ROM, an HD, a memory card, a magneto-optical disk or the like. RAM 5 is used as the work area when various programs are executed, and also as a temporary save area for the error process and a work area during the image processing. RAM 5 may copy various tables in the memory 4 to change the contents of the tables and make the image processing be performed by referring to the changed tables.

The image processing unit 6 quantizes the tonal image data of each pixel into multi-valued image data, and forms a discharge pattern corresponding to a tonal level "T" indicated by the quantized multi-valued data. In this embodiment, tonal image data represented by eight bits (256 tonal levels) is quantized into binary (T=2) print image data, and a discharge pattern is formed to discharge or not to discharge ink in accordance with the binary value "1" or "0".

In the arrangement of this embodiment, although an error dispersion method is used as the multi-valued processing of tonal image data, the invention is not limited thereto, but any desired quasi-halftone processing, such as an average density reservation method and a dither matrix method, may be used. The multi-valued processing is repeated for all pixels in accordance with image density information to form a binary drive signal of discharge and no discharge for each pixel and each discharge opening.

In accordance with the discharge pattern formed by the image data processing unit 6, the printer unit 7 discharges ink and forms a print image made of dots on a printing medium. The printer unit 7 has the structure approximate to that shown in FIG. 1.

Next, the description will be given for a process of generating print data for the printability-improved ink (hereinafter simply called a "P ink" where appropriate) to be used by the printer constructed as above, and for an actual printing operation using the print data.

First Embodiment Arrangement

In the arrangement of this embodiment, dots are formed by partially replacing cyan and magenta data by blue data, blue being the secondary color of cyan and magenta. To this end, blue ink is used as the P ink. The P ink may instead be red ink, red being the secondary color of magenta and yellow, or green ink, green being the secondary color of yellow and cyan, or an ink having the color hue of orange and purple having the color components of the secondary color, or an ink containing components of cyan, magenta and yellow. However, in this embodiment, blue-based ink which is the secondary color of cyan and magenta is used because the print data forming process can be simplified, and because yellow has a high lightness and granularity is not significantly aggravated. If the color tone of a dot formed with blue ink does not match the color tone realized by superposition or mixture of dots formed with cyan ink and magenta ink, the weight coefficient is used to generate print data of blue ink, in accordance with the tonal image data of cyan and magenta, as will be described later.

FIGS. 4A, 4B and 4C are diagrams illustrating the process of generating a blue color signal in accordance with a cyan color component signal and a magenta color component signal.

In FIGS. 4A to 4C, the area indicated by oblique lines represents the secondary color components of blue ink to be printed by being replaced with the cyan and magenta. Specifically, tonal image data of cyan and magenta color signals is compared with each other, and the tonal levels of cyan and magenta color signals subtracted by the lower tonal level thereof are used as the tonal levels of cyan and magenta color signals, and the lower tonal level is used as the tonal level of blue. In the example shown in FIG. 4A, the tonal level of magenta is used as the tonal level of blue, the tonal level of magenta is 0, the tonal value of cyan takes a new tonal value of the white area excepting the oblique line area.

In this manner, for the image represented by superposition or mixture of cyan ink dots and magenta ink dots, the secondary color area is printed with blue. Therefore, a possibility that cyan and magenta dots are locally distributed (clustered) in the image low density area can be made small, and the granularity caused by local clustering of different color dots can be reduced.

In the arrangement of this embodiment, the lightness of a dot formed with blue ink is made higher than the lightness of a dot formed by the ink of either cyan or magenta having a higher lightness, or the optical reflection density is made lower than the optical reflection density of a superposition or mixture of cyan and magenta ink dots. This can be achieved by using blue ink capable of realizing such lightness, or by limiting the tonal level of another blue ink or the blue ink subjected to the image processing. In this manner, the granularity of dots formed with blue ink can be further reduced.

It is known that the granularity of a printed image is increased or reduced mainly by the lightness of ink dots. For example, yellow has a high lightness, so that the granularity of yellow dots is smaller than that of cyan and magenta dots. The granularity of blue ink dots is therefore reduced by raising the lightness of blue ink dots. A lower optical reflection density of dots is preferable from the viewpoint of reducing the granularity, and thus blue ink having the lower optical reflection density than the cyan and magenta ink dots is used.

The lightness of dots can be compared by forming ink dots in the whole area of a printing medium and measuring the lightness of each dot. In order to form ink dots in the whole area of a printing medium, dots are printed generally at a print duty of 100%, i.e., in a so-called solid print, although the "solidity" of the image will depend upon the print resolution of the printer and the size of the ink dots formed.

When the tonal level data of blue ink is to be generated, the weighting process is performed if the image color printed with blue is shifted to cyan or magenta. If the image color is shifted to cyan, as shown in FIG. 4B, the weighting coefficient is determined in such a manner that more color components of magenta (at the tonal level larger than the actual tonal level of magenta) are assigned to blue ink. If the printed blue has the color tone shifted to magenta and if the tonal level of magenta is lower than that of cyan, the weighting coefficient is determined in such a manner that blue is assigned relatively smaller to magenta, as shown in FIG. 4C.

Raising the lightness or lowering the optical reflection density when the tonal image data of blue ink is to be generated, means lowering the color material density of the P ink. It is possible to lower a possibility that the ink discharge defective state such as ink thickening occurs.

The tonal image signal for blue ink is generated during the image processing for generating print image data. Similarly to usual image processing, tonal image data of color components of respective planes of cyan (C), magenta (M), yellow (Y) and black (B) subjected to predetermined processing is input to the image processing unit 6 whereat the following processing is performed. It is obvious that when the tonal image data of each of the color components is input, the image data for the printability-improved ink (P) has not yet been prepared.

For the purposes of description simplicity, cyan ink, magenta ink, yellow ink, black ink, and printability-improved ink are simply called C, M, Y, K and P, respectively, hereinafter.

The C and M image data are compared sequentially for each pixel data C (x, y) and each pixel data M (x, y), and the image data C or M having the lower tonal level is replaced with the P image data, where x is the position of an image to be printed on a printing medium along the head scanning direction shown in FIG. 1, and y is the position along the transport direction of the printing medium.

As described earlier, in accordance with the density of a dot to be formed on the printing medium with P ink, the maximum value of the replacement amount of the cyan or magenta with P ink is preset in order to ensure that the lightness or optical reflection of the dot is larger than a predetermined lightness or smaller than a predetermined optical reflection density. If the replaced P image data is larger than the preset maximum value, the replacement amount is limited to the maximum value.

Also, as described earlier, if the image color to be printed with P ink is shifted to cyan or magenta, the weighting coefficient suitable for the shifted image color is used for the replacement to set the replacement amount of the tonal values of C and M thereafter.

With the above processes, the P image data and the C' and M' image data with reduced tonal values corresponding to the P ink can be generated in accordance with the C and M tonal image data.

In generating the above-described image data, if an image printed with P ink has an influence of Y components, a process of changing Y image data may be performed.

The C', M', Y, K and P image data generated in the above manner is binarized by the error dispersion method. This multi-valued processing method is not limited to error dispersion, however, and any quasi-halftone process, such as a dither method, may be used. If a printer has a function of changing the size and density of ink dots by two steps or more, the multi-valued processing method suitable for this printer may be used, without limiting the invention to the binarizing method.

Second Embodiment Arrangement

Similar to the arrangement of the first embodiment, in the arrangement of the second embodiment, cyan and magenta dots are replaced with blue dots, and the probability that cyan and magenta dots are formed by the replacement process is made small. That is, when cyan and magenta image data is replaced with blue ink image data, cyan and magenta data are replaced generally perfectly, and cyan and magenta dots are not formed.

Specifically, similarly to the first embodiment arrangement, C and M tonal image data is compared to generate P ink image data. This data is subjected to a first binarization by the error dispersion method.

The binarized P ink image data (called "print image data" to distinguish it from the tonal image data of 8 bits having 256 values) is binary data having a value 0 or 1. Next, the print image data is multiplied by a predetermined coefficient 255 to obtain 8-bit data from which the C and M tonal image data is subtracted to obtain C' and M' tonal image data that is actually printed. With this process, if the blue ink (P) is used (if the binary data P is 1), 255 is subtracted from the C and M tonal image data so that the tonal levels of C and M become negative and there is a high possibility that the tonal level becomes 0 by the next binarizing process.

The C', M', Y and K obtained in the above manner are binarized by the second binarizing process to obtain print image data (P print image data has already been binarized by the first binarizing process).

Similarly to the arrangement of the first embodiment, the P ink data of this second embodiment reduces the granularity in the light image area or a low density image area. Since the possibility that cyan or magenta dots are formed in such an area becomes low, the granularity is reduced even further. A print image of a high quality can be formed, and the amount of ink used can be reduced.

As a printer suitable for application of this invention for printing an image on a printing medium, an ink jet printer is generally used.

The invention provides excellent effects for ink jet printers, particularly for recording heads and recording apparatuses of the type provided with means (e.g., an electrothermal conversion element, a laser beam, or the like) for generating heat energy used for discharging ink by changing the state of the ink, because this type can realize high density and high precision in recording.

It is preferable to adopt the typical structure and fundamental principle disclosed, for example, in U.S. Pat. Nos. 4,723,129 and 4,740,796. These structures and principles are applicable to both the so-called on-demand type and continuous type. The on-demand type is particularly effective because at least one drive signal corresponding to record information for giving a rapid temperature rise exceeding nuclei boiling is applied to an electrothermal conversion element disposed near a sheet and liquid path accommodating liquid (ink), thereby to generate heat energy from the electrothermal conversion element, generate film boiling at a heat reaction plane of a recording head, and form a bubble in the liquid (ink) in one-to-one correspondence with the drive signal. Growth and contraction of the bubble discharges the liquid (ink) via the discharge opening (discharge port) to form at least one droplet. It is preferable to use a drive signal having a pulse waveform, because the growth and contraction of the bubble can occur at once and the liquid (ink) can be discharged with excellent response characteristics. It is preferable to use as the drive signal having a pulse waveform, those described in U.S. Pat. Nos. 4,463,359 and 4,345,262. Still more-excellent recording can be realized if the conditions of a temperature rise rate at the heat reaction plane, described in U.S. Pat. No. 4,313,124, are satisfied.

The arrangements of the preferred embodiments described above are applicable to the structure of a recording head having a combination of a discharge opening, a liquid path (linear liquid path or right angle liquid path) and an electrothermal conversion element as disclosed in each of the above-cited specifications, and to the structure that a heat reaction plane is disposed in a bent area as disclosed in U.S. Pat. Nos. 4,558,333 and 4,459,600. The effects of the invention can also be obtained by applying the invention to the design in which a common slit is used as the discharge portion of a plurality of electrothermal conversion elements, as disclosed in JP-A-59-123670, or to that in which an opening for absorbing a pressure wave of heat energy is disposed in correspondence with a discharge portion, as disclosed in JP-A-59-138461. According to the invention, recording can be performed reliably and efficiently, irrespective of the type of a recording head.

The invention is also effective and applicable to a recording head of the full-line type, in which the length of the recording head is equal to the maximum width of recording medium on which the recording apparatus can record data. Such a recording head may be a combination of a plurality of recording heads covering the full-length or an integrated single recording head.

The invention is effective for a recording head of a serial type, described above, a recording head fixedly mounted on the apparatus frame, a removable recording head of a chip type in which electric connection is established between the apparatus and head and ink is supplied from the apparatus when the head is mounted on the apparatus, and a recording head of a cartridge type in which an ink tank is integrally mounted on the recording head.

It is preferable that discharge recovery means, supplemental auxiliary means and the like of a recording head are added to the structure of the recording apparatus of the embodiment arrangements, because the effects of the invention can be made stabler. Such means of a recording head may be capping means, cleaning means, pressure/suction means, auxiliary heating means having an electrothermal conversion element, another heating element or a combination of such expedients, and auxiliary discharge means for discharging ink not for recording.

As to the types and the number of recording heads, just one recording head may be provided for monochromatic ink, or a plurality of recording heads may be provided for a plurality of inks having different recording densities. The preferred embodiments are very effective not only for a recording apparatus having only a recording mode of one main color, such as black, but also for a recording apparatus having a plural-color recording mode or a full-color mixture mode, or both, irrespective of whether the apparatus has one integral recording head or a plurality of recording heads.

In the arrangements of the invention descried above, although liquid ink is used, it is possible to use ink which is solid at room temperature or lower and which softens or liquefies above room temperature. For an ink jet printer, the temperature of ink is generally controlled in a range from 30° C. or higher and 70° C. or lower to keep the ink viscosity in a stable-discharge range. Ink which can be liquefied when a recording signal is supplied may also be used. In order to use the temperature rise produced by the generated heat energy for changing the state of the ink from solid to liquid, or in order to prevent ink evaporation, ink which is solid in its natural state and liquefied by heating may also be used. The invention is applicable to using ink which has the characteristics that it is liquefied only when heat energy is applied, such as ink which is liquefied and discharged upon application of heat energy corresponding to a record signal, and ink which starts to solidify just before it reaches the recording medium. As described in JP-A-54-56847 or JP-A-60-71260, such ink may be stored in porous sheet recesses or through-holes in the shape of liquid or solid, facing an electrothermal conversion element. In the foregoing arrangements, the film boiling method described above is most effective for each ink described above.

An ink jet printer of the preferred embodiments may be an ink jet printer used as an image output terminal of an information processing apparatus such as a computer, a copy machine with a reader or the like, or a facsimile apparatus having a transmission/reception function.

Other Embodiments

The invention is also applicable to a system having a plurality of apparatuses (e.g., a host computer, an interface apparatus, a reader, a printer and the like) or to a single apparatus (e.g., a copier, a facsimile or the like).

Figure 5:
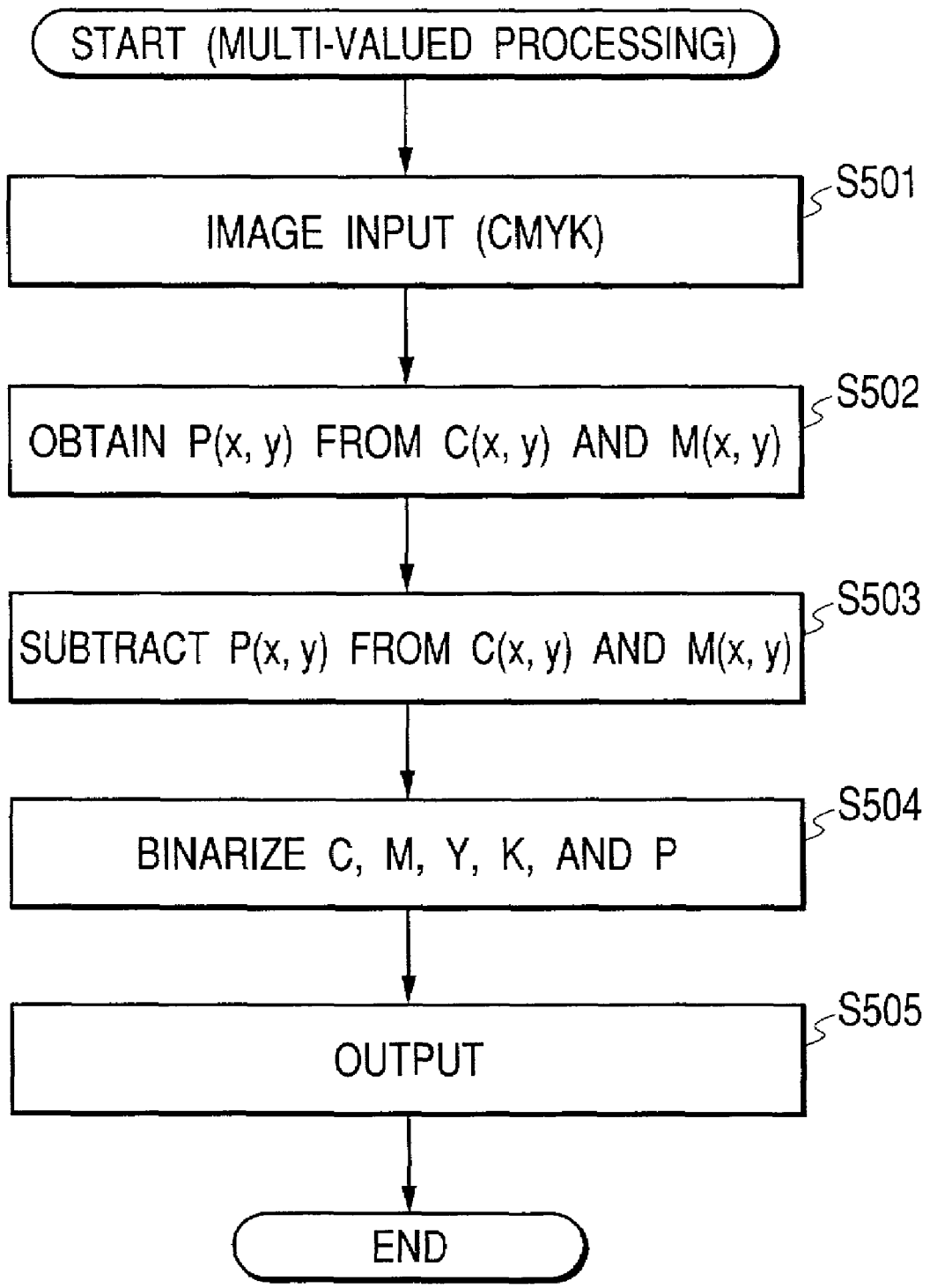
FIG. 5 is a flow chart illustrating image processing including a process of generating blue ink data according to a first embodiment of the invention.
Figure 7:
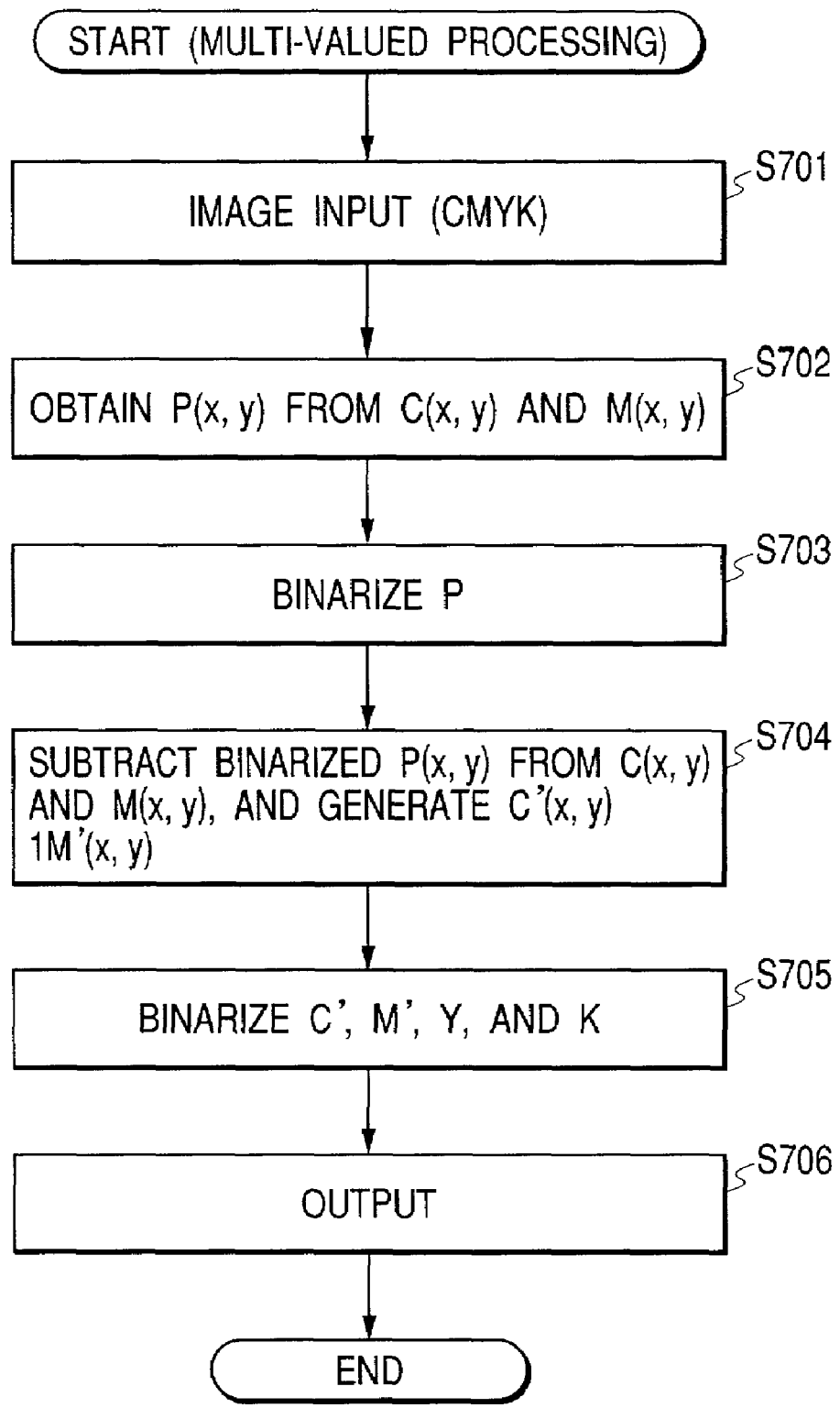
FIG. 7 is a flow chart illustrating image processing including a process of generating blue ink data according to a second embodiment of the invention.

The scope of the invention includes also a case in which software program codes shown in FIGS. 5 and 7 and realizing the function of each embodiment described above are supplied to a computer (CPU or MPU) of the apparatus or system connected to various devices realizing the embodiment function, and the computer operates the devices in accordance with the stored programs.

In this case, the software program codes themselves realize the embodiment functions. Therefore, the program codes themselves and means for supplying the program codes, e.g., a storage medium storing the program codes, constitute embodiments of the present invention.

The storage medium for storing such program codes may be a floppy disk, a hard disk, an optical disk, a magneto optical disk, a CD-ROM, a magnetic tape, a nonvolatile memory card, a ROM or the like.

It is obvious that the program codes are included in the embodiments of the invention, in which not only the computer executes the supplied program codes to realize the embodiment function but also the program codes in cooperation with an OS (operating system) running on the computer or with another application or the like realize the embodiment function.

It is obvious that the scope of the invention also includes a case in which the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The above-described embodiment arrangements will be described more specifically.

First Embodiment in this embodiment, the ink jet printer of the first embodiment arrangement is used for printing an image by using inks and printability-improved ink determined by the image processing. This printer discharges ink of 8.5±0.5 PI in amount from each head at a resolution of 600 dpi.

The components of inks containing color materials are as follows:

| (Y ink recipe) | |
|---|---|
| Glycerine | 5.0 wt parts |
| Thiodiglycol | 5.0 wt parts |
| Uric acid | 5.0 wt parts |
| Isopropyl alcohol | 4.0 wt parts |
| Dye C.I. direct yellow 142 | 2.0 wt parts |
| Water | 79.0 wt parts |
| (M ink recipe) | |
| Glycerine | 5.0 wt parts |
| Thiodiglycol | 5.0 wt parts |
| Uric acid | 5.0 wt parts |
| Isopropyl alcohol | 4.0 wt parts |
| Dye C.I. acid red 289 | 2.5 wt parts |
| Water | 78.5 wt parts |
| (C ink recipe) | |
| Glycerine | 5.0 wt parts |
| Thiodiglycol | 5.0 wt parts |
| Uric acid | 5.0 wt parts |
| Isopropyl alcohol | 4.0 wt parts |
| Dye C.I. direct blue 199 | 2.5 wt parts |
| Water | 78.5 wt parts |
| (K ink recipe) | |
| Glycerine | 5.0 wt parts |
| Thiodiglycol | 5.0 wt parts |
| Uric acid | 5.0 wt parts |
| Isopropyl alcohol | 4.0 wt parts |
| Dye food black 2 | 3.0 wt parts |
| Water | 78.0 wt parts |
| (Printability-improved P ink recipe) | |
| Polyallylamine hydrochloride | 5.0 wt parts |
| Benzalkonium chloride | 1.0 wt part |
| Diethylene glycol | 10.0 wt parts |
| Dye basic blue 47 | 1.0 wt part |
| Water | 83.0 wt parts |

As a printing medium, PB paper (manufactured by Canon Inc.) was used, which is suitable for both electrophotography and ink jet printing.

Printing was performed by using the above-described color material inks (C, M, Y, K), printability-improved ink (P) and print medium.

FIG. 5 is a flow chart illustrating the image processing and its print operation including mainly a process of generating P ink data and binarizing ink data, according to the first embodiment.

At Step S501, tonal image data of respective colors C, M, Y and K is input.

At Step S502, P ink data is obtained from C and M tonal image data. The pixel position x is defined along the head scanning direction, and the pixel position y is defined along the transport direction of the printing medium. Pixel data C (x, y) and pixel data M (x, y) are given a level among 8-bit (256) tonal levels.

FIG. 6A shows examples of tonal image data of each pixel. Numbers shown in FIGS. 6A and 6B indicate the tonal level of each of the color components. The tonal level 0 means the lightest area, and the tonal level 255 means the darkest area, represented by 8-bit data.

In this embodiment, the color, and optical density or lightness of a P ink dot on a printing medium are obtained beforehand. In accordance with the obtained data, the weight coefficients s and t for replacing the C and M ink tonal image data with P ink data and the maximum replacement value are obtained. For example, by replacing C ink by P ink, the color component and optical density of C can be realized so that the color component (under color C) corresponding to the replaced area is removed. The C under-color removal process and M under-color removal process are collectively called an under-color removal process by P ink. In this embodiment, since blue P ink is used, the process is called an under-blue removal (UBR) process, and the tonal level of the color component to be subjected to the UBR process is called a UBR value. The replacement relation between P ink and C and M inks is represented by:

$$C(i,j)=C'(i,j)+s \times P(i,j)$$

$$M(i,j)=M'(i,j)+t \times P(i,j)$$

where s and t are positive coefficients.

This relation means that the color and optical density of P dots printed on a printing medium with a printer at a predetermined resolution in so-called solid printing take the same values as those of C dots printed at a print duty of s×100% and M dots printed at a print duty of t×100%, respectively. The total sum of the UBR values obtained by multiplying the P tonal value by each of the coefficients s and t and each of the color components C' and M' left after the UBR process is the tonal value of the input tonal image data of each of C and M (refer to FIGS. 4A to 4C).

At Step S503, C' (i, j) and M' (i, j) are calculated from the above relation by:

$$C'(i,j)=C(i,j)-s \times P(i,j)$$

$$M'(i,j)=M(i,j)-t \times P(i,j)$$

With the Steps S502 and S503, assuming that s and t are 1, from the tonal image data of C (i, j)=56 and M (i, j)=94 of the pixel (i, j) shown in FIG. 6A, the tonal image data of P (i, j)=56, C' (i, j)=0 and M' (i, j)=38 can be obtained as shown in FIG. 6B. Similarly, from the C and M tonal image data of the pixels (i+1, j), (i+2, j), . . . , (i+1. j+1), the C' and M' tonal image data can be obtained.

In this example, the coefficients s ant t are assumed to be both 1.00. As described earlier, the weight coefficients are preset in accordance with the maximum optical density of P ink and the color hue of a dot formed with P ink. At Step S504, C', M', Y, K and P are binarized by the error dispersion method. At Step S505, ink dots are formed on the printing medium with the printer shown in FIG. 1. The printed images were evaluated by using NI (SIO 300) images of SCID. These images were also used in Comparison Examples to be later described.

According to the embodiment, instead of forming cyan and magenta dots, blue dots are formed so that the granularity in the low density image area and light image area can be reduced, and printing with the reduced number of total print dots can be performed by relatively simple processing.

The image processing described in this embodiment or in the embodiment arrangement is not necessarily performed by a printer. For example, the image processing may be performed by a printer driver of a personal computer used as the host apparatus for a printer. The print data obtained by the image processing at the host apparatus may be supplied to the printer to print the processed data at the printer.

First Comparative Example

C, M, Y and K dots are printed with the printer used by the first embodiment without performing the image processing of the first embodiment.

The granularity by cyan and magenta dots appeared locally in the light area (low density area) of the printed image. In the dark area (high density area), bleeding by excessive formation of ink dots appeared locally.

Second Embodiment

This embodiment corresponds to the second embodiment arrangement described earlier. The ink jet printer, color material inks, printability-improved ink printing medium similar to those of the first embodiment are used. However, the image processing is different, and the following image processing is performed for generating tonal image data of a blue ink.

FIG. 7 is a flow chart illustrating the image processing of this embodiment, mainly the process of generating tonal image data of blue ink.

At Step S701, tonal image data of each color C, M, Y, K is input. At Step S702, in accordance with the C and M image data, the P tonal image data is obtained.

FIG. 8A shows examples of the tonal image data. Similar to the description with reference to FIG. 6, numbers shown in FIGS. 8A to 8E indicate the tonal level of each of the color components. The tonal level 0 corresponds to the lightest pixel, and the tonal level 255 corresponds to the darkest pixel. The tonal level is represented by 8-bit data.

As shown in FIG. 8B, similarly to the first embodiment, the tonal image data of P ink for the pixel (i, j) is obtained by using the weight coefficients s and t to be used for replacing the C and M tonal image data with the P tonal image data.

The P tonal image data is sequentially obtained for the pixels (i+1, j), (i+2, j), . . . , (i+1, j+1) in accordance with the C and M tonal image data. Also in this example, the coefficients s and t are assumed to be both 1.00.

Unlike the first embodiment, at Step S703 the P tonal image data is binarized by the error dispersion method to obtain the results shown in FIG. 8C.

In the example shown in FIG. 8C, P (i, j)=(dot corresponding to one bit signal is formed), P (i+1, j)=0, P (i, j+1)=0, and P (i+1, j+1)=0. A signal of "P=1" is a value obtained by a predetermined correspondence conversion at Step S704. Here, the value is shown as a 8-bit value of 255.

That is, at Step S704, the P print image data (binary data) is subjected to the predetermined correspondence conversion. If the binary data is "1", an 8-bit value 255 is given, whereas if the binary data is "0", an 8-bit value 0 is given. By using the converted P data, C' (i, j) and M' (i, j) are obtained from the following equations:

$$C'(i,j)=C(i,j)-p\times P(i,j)$$

$$M'(i,j)=M(i,j)-q\times P(i,j)$$

where p and q are positive coefficients.

As shown in FIG. 8D, C' (i, j)=−199 and M' (i, j)=−161 are obtained for the P (i, j) having the binary data of 1 (8-bit value of 255). In this example, for the purposes of simplicity, it is assumed that p=q=1. In this manner, the P data is binarized beforehand to obtain the 8-bit value of 255 or 0. By subtracting this P value, C' and M' are obtained which each have a value of 0 or a negative value.

The C' and M' tonal value data binarized by the next Step S705 is converted into a binary value of 0 even if any quasi halftone process is performed, as shown in FIG. 8E. Therefore, in the P (blue) ink dot, cyan and magenta dots are formed not at all and the granularity that would otherwise be caused by cyan and magenta dots does not occur.

At Step S705, C', M', Y and K obtained in the above manner are binarized by the error dispersion method. The binarized results are shown in FIG. 8E.

At Step S706, by using the binary data obtained in the above manner, ink dots are printed on a printing medium.

In this embodiment, blue dots are formed instead of forming cyan and magenta dots so that the granularity can be reduced. The total number of dots can be reduced by simple processing, and according to this embodiment, cyan and magenta dots are not formed in the blue ink dot so that the granularity can be reduced further.

Third Embodiment

In this embodiment, the following recipe of the P blue ink is used to use blue ink having a lightness lighter than M ink.

(Printability-Improved P Ink Recipe)

| | |
|---|---|
| Polyallylamine hydrochloride | 5.0 wt parts |
| Benzalkonium chloride | 1.0 wt part |
| Diethylene glycol | 10.0 wt parts |
| Acetyllenol | 0.5 wt part |
| (Kawaken Fine Chemicals Co. Ltd) | |
| Dye basic blue 47 | 0.5 wt part |
| Water | 83.0 wt parts |
| Lightness: magenta ink L* = 48 | |
| blue ink L* = 55 | |

Similarly to the above embodiments, cyan and magenta tonal image data was printed by replacing it with the blue ink having the above-described compositions. Since the ink dots were replaced with blue ink dots, the total number of dots was able to be reduced, and dots were prevented from being locally distributed (clustered). Since the lightness of a blue ink dot is low, a good printed image was obtained, with improved granularity in the light image area.

Second Comparative Example

The following recipe of the P ink was used.

(Printability-Improved P Ink Recipe)

| | |
|---|---|
| Polyallylamine hydrochloride | 5.0 wt parts |
| Benzalkonium chloride | 1.0 wt part |
| Diethylene glycol | 10.0 wt parts |
| Acetyllenol EH | 0.5 wt part |
| (Kawaken Fine Chemicals Co. Ltd) | |
| Dye basic blue 47 | 3.5 wt parts |
| Water | 80.0 wt parts |

As seen from these compositions, the dye density of blue is higher than in the above embodiment. Therefore, the granularity resulting from cyan and magenta ink dots existed in a partial image area, and the granularity due to blue ink dots also existed in a partial image area. Bleeding as a result of excessive ink dots existed in a partial image area.

Instead of the P blue ink and other inks of the preferred arrangements, a cation dye may be used as the blue ink and anion dyes may be used as the color material of other inks.

As described above, of a plurality of different color materials to be used by a printer, print data of the secondary color is generated for predetermined two color materials, and print data replaced at least partially with the generated secondary color print data is generated. By using these print data, printing is performed. As a result, even if dots are printed by using the predetermined two color materials, the print image can be formed by using at least partially the secondary color. Therefore, a low density image area or a high lightness image area where dots of the predetermined colors are locally distributed (clustered) can be made small.

Furthermore, in generating the print data of the predetermined color materials, n-value print data for the two color materials is generated in accordance with m-value data of the two color materials subtracted by the secondary color m data. Therefore, for example, in generating the print data of the two color materials by binarizing the (m=256) value data, the secondary color data is once binarized to "1" or "0" data, the "1" and "0" data being made in one-to-one correspondence with "255" and "0", respectively. In accordance with the 256 value data subtracted by the corresponding value of the binary data, the print data of the two color materials is generated. There is a high possibility that this print data is "0", that is, there is a high possibility that the image is printed by the predetermined two color materials.

It is therefore possible to reduce the granularity of a printed image by simple image processing.

What is claimed is:

1. An image processing method of generating print data for a plurality of different color materials to be used by a printer, the method comprising:

a step of generating print data of blue by using print data of cyan and magenta from among the plurality of colors of print data; and a step of generating processed print data, in which original print data of cyan and magenta are replaced at least partially with the print data of blue, wherein the color material for generating the print data of blue has a higher lightness than do the color materials for generating the print data of cyan and magenta.

2. An image processing method according to claim 1, wherein cyan and magenta are two color hues from among three primary colors for color printing.

3. An image processing method according to claim 1, wherein the color material is ink.

4. An image processing method according to claim 3, wherein the color material of blue is a cation dye and other color materials are anion dyes.

5. A printer for printing data by using print data for a plurality of different color materials to be used by a printer, based on data to be printed, the printer comprising:
   printing means for printing each color by using a plurality of different color materials based on the print data; and
   data supplying means for supplying said printing means with print data generated by a secondary mixture color data generating process of generating the print data of blue by using print data of cyan and magenta from among the plurality of colors of print data and by a data generating process of generating processed print data, in which original print data of cyan and magenta is replaced at least partially with the print data of blue,
   wherein the color material for generating the print data of blue has a higher lightness than do the color materials for generating the print data of cyan and magenta.

6. A printer according to claim 5, wherein cyan and magenta are two color hues from among three primary colors for color printing.

7. A printer according to claim 5, wherein the color material is ink.

8. A printer according to claim 5, wherein said printing means includes a head for each of the plurality of color materials for printing by discharging ink.

9. A printer according to claim 8, wherein each head forms a bubble in the ink by using heat energy and discharges the ink by means of pressure of the bubble.

10. A printer according to claim 5, wherein the color material of blue is a cation dye and other color materials are anion dyes.

11. A computer readable medium storing a computer program readable and executable by an information processing apparatus, the computer program realizing image processing for generating print data for a plurality of different color materials to be used by a printer, based on data to be printed, the computer program comprising:
   a step of generating print data of blue by using print data of cyan and magenta from among the plurality of colors of print data; and
   a step of generating processed print data, in which original print data of cyan and magenta are replaced at least partially with the print data of blue,
   wherein the color material for generating the print data of blue has a higher lightness than do the color materials for generating the print data of cyan and magenta.

* * * * *